United States Patent [19]

Takahashi et al.

[11] Patent Number: 4,628,328
[45] Date of Patent: Dec. 9, 1986

[54] THERMOMAGNETIC RECORDING APPARATUS

[75] Inventors: Yuichi Takahashi, Ebina; Akira Tasaki, Ibaragi; Teruhiko Itami; Shunsuke Tomiyama, both of Ebina, all of Japan

[73] Assignee: Fuji Xerox Co., Ltd., Tokyo, Japan

[21] Appl. No.: 730,387

[22] Filed: May 6, 1985

[30] Foreign Application Priority Data

Jul. 6, 1984 [JP] Japan .................. 59-140385

[51] Int. Cl.⁴ .................................. G01D 15/12
[52] U.S. Cl. ...................... 346/74.4; 346/74.6
[58] Field of Search .............. 346/74.4, 74.3, 74.6, 346/76 PH; 360/59, 134, 132; 430/39; 400/119; 358/301

[56] References Cited

U.S. PATENT DOCUMENTS 4,531,137  7/1985  Drews et al. .............. 346/74.4

Primary Examiner—Arthur G. Evans
Attorney, Agent, or Firm—Aaron B. Karas

[57] ABSTRACT

The present invention relates to a thermomagnetic recording apparatus in which a chemical compound material the Curie point of which varies in response to a ratio of chemical combination in chemical compound constituent is utilized as a magnetic material for its magnetic recording medium, and the Curie temperature is set higher than the ambient temperature by a prescribed value on the ratio of chemical combination determined, thereby resulting in printing at a relatively low temperature and precision of printing in a prescribed degree.

7 Claims, 4 Drawing Figures

X-value of FexN

THERMOMAGNETIC RECORDING APPARATUS

TECHNICAL FIELD

The present invention relates to a thermomagnetic recording apparatus, and more particularly to a thermomagnetic recording apparatus in which precision of printing is improved in such a manner that a chemical compound material the Curie point of which varies in response to a ratio of chemical combination in chemical compound constituent is utilized as a magnetic meterial for magnetic recording medium, and the Curie temperature is set higher than the ambient temperature by a prescribed value on the basis of the ratio of chemical combination determined.

BACKGROUND OF THE INVENTION

As shown in FIG. 1, a thermomagnetic recording apparatus involves a belt 3 having a magnetic recording layer prepared by coating a macro-molecular film (made of, for example, polyethylene terephthalate, polyimide or the like) of 50-150 μm with a despersion obtained by dispersing a magnetic material such as $CrO_2$ or the like into a curable organic macro-molecular solvent (such as polyurethane, polyimide or the like), and the belt thus obtained is held endlessly by rolls 1 and 2. Around the rotating belt 3 are provided a permanent magnet 4 magnetizing the belt 3 in a prescribed direction, a heating head array 5 (comprizing another permanent magnet having smaller magnetic force than that of the permanent magnet 4 and reverse magnetizing direction thereto and an array of a heat-generating element made of, for example, ruthenium oxide $RuO_2$) for forming latent magnetic image on the magnetic recording layer in response to printing signal, a developer 6 for developing the latent magnetic image formed on the magnetic recording layer of the belt 3 by the use of magnetic toner, a pretransferring corotron 7 applying negative charge to the magnetic toner, a transferring means 8 made of a conductive rubber roller and transferring a toner image on the belt 3 to a recording paper by applying a prescribed voltage thereto, and a cleaner 9 or the like composed of a brush with raised soft fibers or blades made of an elastic material and eliminating the magnetic toner remained on the magnetic recording layer of the belt 3.

In the above thermomagnetic recording apparatus, when the roll 1 or 2 is driven by means of a motor (not shown) along the direction of arrow, the belt 3 rotates so that the magnetic recording layer on the belt 3 is unidirectionally magnetized by the permanent magnet 4. When the magnetic reocrding layer magnetized unidirectionally in the belt 3 is heated by heat generation in response to printing signal of the heating held array 5 and simultaneously magnetized in the reverse direction by the permanent magnet, latent magnetic image is formed on the magnetic recording layer of the belt 3. Such latent magnetic image is developed with the magnetic toner to form toner image by means of the developer 6. Negative charge is given to the toner image thus obtained by means of the transferring corotron 7, and the toner image is transferred to the recording paper 10 by means of the transferring means 8 to which positive voltage has been applied. The recording paper 10 onto which the toner image has been transferred is delivered in the direction of arrow, and fixed by means of a fixing means (not shown) thereby completing the recording. Furthermore the magnetic recording layer on the belt 3 is unidirectionally magnetized by the permanent magnet 4, the toner remained on the magnetic recording layer of the belt 3 is removed by means of the cleaner 9, and then the apparatus is prepared for the following recording operations.

$CrO_2$ used herein as a magnetic material has the following characteristic properties:
Saturation Magnetization $\sigma_s$: 85-90 emu/g
Coercive Force $H_c$: 400-600 Oe
Curie Point: 120°-130° C.

As is apparent from the above characteristic properties, since the Curie point is comparatively low, it is possible to write with low energy by the use of $CrO_2$. (Such prior art as described above is disclosed in, for example, Japanese Patent Laid-open Nos. 36958/1976, 32328/1979, 17372/1981, 26101/1982, 59304/1982, 140307/1982, 180004/1983, 180008/1983, 6031/1966 etc.)

In accordance with a conventional thermomagnetic recording apparatus, Curie point of a chemical compound material used for its magnetic material is determined as the inherent property of the chemical compound material. Thus power consumption becomes higher and the periphery of a heating head array deteriorates thermally in case of utilizing a chemical compound material of high Curie point. On the other hand, where a difference between ambient temperature and a Curie temperature is smaller in employing a chemical compound material of low Curie point, there is such a fear that precision of printing becomes inferior.

SUMMARY OF THE INVENTION

Accordingly a first object of the present invention is to provide a thermomagnetic recording apparatus in which precision of printing is improved by controlling Curie point of a magnetic material in its magnetic recording layer.

A second object of the present invention is to provide a thermomagnetic recording apparatus in which power consumption in its thermal head is reduced by controlling Curie point of a magnetic material in the magnetic recording layer.

A third object of the present invention is to provide a thermomagnetic recording apparatus in which durability of the apparatus is improved by keeping Curie point of a magnetic material comparatively low.

For the sake of realizing the above objects, there is provided a thermomagnetic recording apparatus in accordance with the present invention which comprises a heating head array dirven in response to printing signal, a magnetic recording layer previously magnetized in a prescribed direction on which latent magnetic image is formed on the basis of heat generation of said heating head array, a developing means for developing said latent magnetic image with a magnetic toner, a transferring means for transferring a toner image developed to a recording paper, and a fixing means for fixing the image transferred, said magnetic recording layer containing a chemical compound material the Curie point of which varies in response to a ratio of chemical combination in chemical compound constituent as a magnetic material, and the Curie temperature being set higher than the ambient temperature by a prescribed value on the ratio of chemical combination determined.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS

Figure 1:
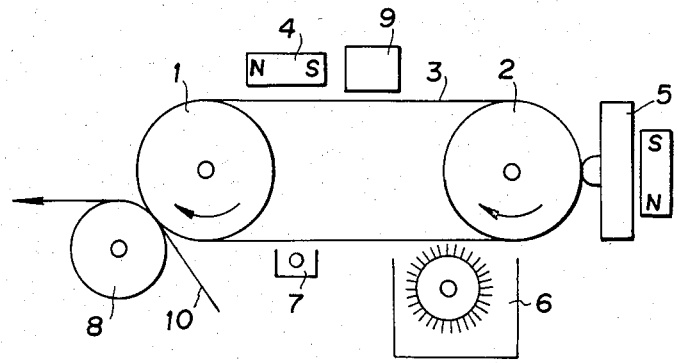
FIG. 1 is an explanatory diagram showing a conventional thermomagnetic recording apparatus.
Figure 2:
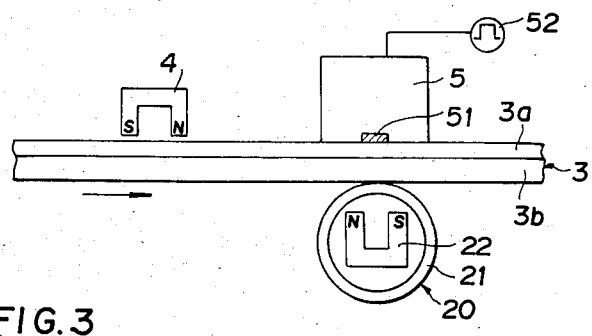
FIG. 2 is an explanatory diagram showing a thermomagnetic recording apparatus according to an embodiment of the present invention

Preferred embodiments of the present invention will be described in detail hereinbelow by referring to the accompanying drawings wherein FIG. 2 shows a thermomagnetic recording apparatus according to an embodiment of the invention in which corresponding parts are shown therein by corresponding reference characters in FIG. 1 and parts other than the essential part of the present invention are omitted in FIG. 2.

Referring to FIG. 2, a belt 3 is composed of a magnetic recording layer 3a and a base substrate 3b, and a heating head array 5 contains a heat-generating element 51 made of $RuO_2$ and is adapted to be contact with the belt 3 by means of a back-up roll 20 with a prescribed pressure. The back-up roll 20 is provided with a sleeve 21 being rotated while contacting the belt 3 and a permanent magnet 22 contained in the sleeve 21. A permanent magnet 4 magnetizing unidirectionally the magnetic recording layer 3a on the belt 3 is placed ahead of the heating head array 5. The permanent magnet 22 in the back-up roll 20 is of weaker magnetic force than that of the permanent magnet 4 and the magnetizing direction of the permanent magnet 22 is reverse to that of the latter.

The magnetic recording layer 3a is prepared in such a manner that the base substrate 3b made of polyethylene terephthalate, polyimide or the like and having a thickness of 50–150 μm is coated with a dispersion obtained by dispersing a magnetic material such as iron nitride into a high polymeric resin binder such as polyurethane, polyimide or the like with a thickness of 5–30 μm. In the case where a thickness of the magnetic recording layer 3a is 5 μm or less, the layer peels off due to wear, whilst pliability of the belt disappears in the case where such a thickness is 30 μm or more.

Iron nitride used herein is obtained by treating iron in the atmosphere containing nitrogen. More specifically, acicular α-Fe powder obtained by reducing acicular Goethite is placed in a quartz core pipe, $NH_3$ gas and $H_2$ gas are passed through the core pipe in the proportion of 15:2 in flow rate of both the gases, and such α-Fe powder is maintained for about 2 hours while heating at 400° C. thereby obtaining iron nitride having a composition of $Fe_3N$. The characteristic properties of $Fe_3N$ are as follows:

Saturation Magnetization $\sigma_s$: 90–100 emu/g
Coercive Force Hc : 400–600 Oe
Curie Point : 200°–220° C.

Figure 3:
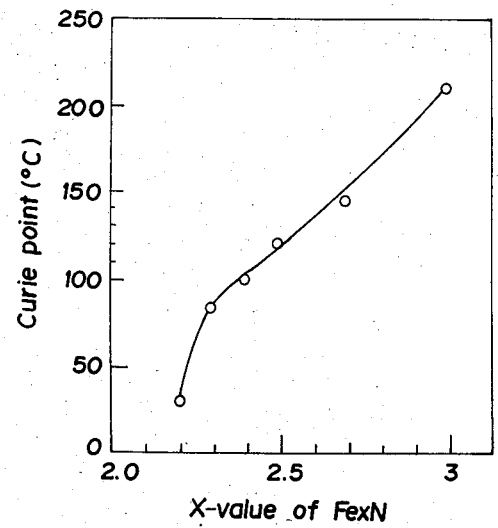
FIG. 3 is a graphical representation indicating a characteristic curve of Curie point with respect to ratio of chemical combination of iron nitride.

In the above processing steps, when a proportion of $NH_3$ gas and $H_2$ gas in the flow rate as well as heating condition are changed, it is possible to advance nitriding of Fe and to continuously change a ratio in chemical combination of nitrogen from that (composition) of $Fe_3N$ to $Fe_{2.3}N$. Thus, as shown in FIG. 3 wherein ratio of Fe and N in chemical combination (composition) is plotted as abscissa and Curie point as ordinate, when the ratio in chemical combination (composition) changes from $Fe_3N$ to $Fe_{2.3}N$, Curie point varies continuously from 220° C. to 80° C. In the present invention, Curie temperature of the magnetic material (iron nitride) is set to be higher than the ambient temperature by at least 40° C. by controlling the ratio in chemical combination (composition) x. For instance, Curie point may be set at 80° C. as a result of controlling x=2.3 in the case where ambient temperature is 40° C.

In place of the above-mentioned acicular Goethite, α-iron oxide, γ-iron oxide, or tri-iron tetroxide may be utilized.

In the aforementioned thermomagnetic recording apparatus, the belt 3 is driven in the direction of arrow to unidirectionally magnetize the magnetic recording layer 3a on the belt 3 by the permanent magnet 4, and the heat-generating element 51 in the heating head array 5 is made to cause heat generation by means of a driving part 52 in response to printing signal, so that latent magnetic image is formed on the magnetic recording layer 3a by the heating of the heating element 51 and the magnetization in reverse direction of the permanent magnet 22 (the following operations are omitted).

Next, examples of the magnetic recording layer 3a will be described hereinbelow.

EXAMPLE 1

Acicular α-iron oxide (α-$Fe_2O_3$) powder was placed in a quartz core pipe, and $H_2$ gas was passed through the core pipe at a flow rate of 900 m/min. and maintained at 400° C. for 1 hour to obtain acicular α-Fe powder. Thereafter $NH_3$ gas and $H_2$ gas were passed through the core pipe at a flow rate of 1500 ml/min. and 200 ml/min. respectively, and maintained at 400° C. for 2 hours to obtain $Fe_3N$ magnetic powder.

A magnetic coating having the following composition was prepared by using the resulting $Fe_3N$ magnetic powder.

$Fe_3N$ Magnetic Powder: 150 parts by weight
Vinyl Acetate-Vinyl Chloride Copolymer: 10 parts by weight
Polyester-Polyurethane Copolymer: 20 parts by weight
Methyl Ethyl Ketone: 300 parts by weight After sufficiently admixing the above magnetic coating, a polyimide film substrate having a thickness of 75 mm was coated therewith so as to obtain a thickness (after dyring) of 10–12 μm thereby obtaining a thermomagnetic recording medium (called hereinafter "sample 1").

EXAMPLE 2

Iron nitride powder was prepared in accordance with the same manner as that of Example 1 except that $H_2$ gas was passed through at a flow rate of 150 ml/min. as nitriding condition. As a result of reaction, a magnetic powder having composition of $Fe_{2.5}N$ was obtained. A thermomagnetic recording medium was fabricated by utilizing the resulting magnetic powder in accordance with the same manner with that of Example 1 (called hereinafter "sample 2").

Residual magnetic flux density Br, coercive force Hc, and Curie point Tc were measured in respect of samples 1 and 2 as well as a tape of using $CrO_2$ as magnetic material ("Crolyn" manufactured by Du Pont Co.) for reference sample, respectively, and the results thereof are shown in the following Table 1.

TABLE 1

|  | Br (Gauss) | Hc (Oe) | Tc (°C.) |
| --- | --- | --- | --- |
| Sample 1 | 2300 | 530 | 210 |
| Sample 2 | 2100 | 400 | 120 |
| Reference Sample | 1100 | 550 | 125 |

From these measured results, it was found that samples 1 and 2 were suitable for thermomagnetic recording media.

Next, latent magnetic images were formed on magnetic recording layers of samples 1 and 2 as well as on the tape of the reference sample, respectively, by utilizing the thermomagnetic recording apparatus shown in FIG. 2 wherein a degree of fineness of the heating head array 5 was 8 dots/mm, and magnetic fields of the permanent magnet 4 in the magnetic recording layer 3a of the belt 3 and the permanent magnet 22 were 100 gauss and 1500 gauss, respectively.

(1) Experiment for measuring optical reflection density (a) With respect to sample 1

Latent magnetic image was formed on the magnetic recording layer 3a of sample 1 by driving the heating head array 5 under such condition that an electromotive force impressed to the heating head array 5, a driving time (thermally impressed pulse duration), and a line rate are 16 V, 2 m.sec, and 10 m.sec, respectively. The resulting latent magnetic image was visualized with single-component magnetic toner, and the image thus obtained was transferred to a recording paper and fixed thereon. In this case, optical reflection density was 1.4.

(b) With respect to sample 2

Electromotive force of 13 V was impressed to the heating head array 5 (other conditions were the same with those of Experiment (a)). In this case, optical reflection density was 1.4.

(c) With respect to reference sample,

Recording operations were carried out in accordance with the same conditions with those of Experiment (b). In this case, optical reflection density was 1.1.

(2) Experiment for measuring wear of the heat-generating element 51

(a) With reference to samples 1 and 2,

The belt was traveled over 30 Km under the magnetic recording layer 3a in contact with the heating head array 5, wear of the heat-generating element 51 was thereafter checked. As a result, no wear was substantially observed. Further there was no influence upon the formation of latent magnetic image even after the above traveling of the belt 3. In this respect, a conventional magnetic recording layer made from a magnetic material of $CrO_2$ has involved such a disadvantage that $RuO_2$ utilized as its heat-generating element wears off because of high hardness of $CrO_2$, so that latent magnetic image is not favorably formed (results in wear of a magnetic tape containing $CrO_2$ will be described hereinbelow) and in addition, there was such a situation that procurement of $CrO_2$ was difficult at that time. On the other hand, when $\gamma\text{-}Fe_2O_3$ having not so high hardness is used as a magnetic material in order to avoid wear of its heat-generating element, it results in such a disadvantage that a heat-generating temperature of the heat-generating element must be increased considerably because the Curie point of $\gamma\text{-}Fe_2O_3$ is about 500° C. For this reason, if laser beam or flash light is utilized as the heat-generating element, a means or device required therefor becomes expensive or complicated. In this respect, there was no substantial problem as to wear of iron nitride.

(b) With reference to reference example,

As a result of measuring a value of resistance of the heat-generating element 51 in accordance with the same manner as that of Experiment (a), it decreased from 300 Ω to 150 Ω and wear was also observed by means of microscopic observation. Although recording operations were effected in accordance with the aforementioned Experiment (c), favorable image could not be obtained.

While a magnetic recording layer has been formed by using only one kind of iron nitride powder having the same ratio in chemical combination (composition) x in the above Examples, two or more kinds of iron nitride powders each having a ratio in chemical combination (composition) within a range of from $Fe_{2.3}N$ to $Fe_3N$ may also be used. Furthermore, although aforesaid magnetic recording layer has been formed by such a manner that a dispersion has been previously prepared by dispersing iron nitride into a polymeric resin, and a non-magnetic substrate is coated with the resulting dispersion, an iron nitride film may be formed on a non-magnetic substrate by other means than the above coating such as deposition, sputtering and the Moreover it has been stated above if a ratio in chemical combination (composition) x of $Fe_xN$ is less than 2.3, the Curie point becomes lower than 80° C. so favorable image cannot be obtained because of rise of internal temperature, whilst if the ratio is more than 3, the Curie point becomes higher than 220° C. so that energy to be applied to heating head array becomes also much higher. As a result, since there is a fear of damage of such heat-generating element. Therefore, a ratio thereof is preferably 2.3 to 3.

Figure 4:
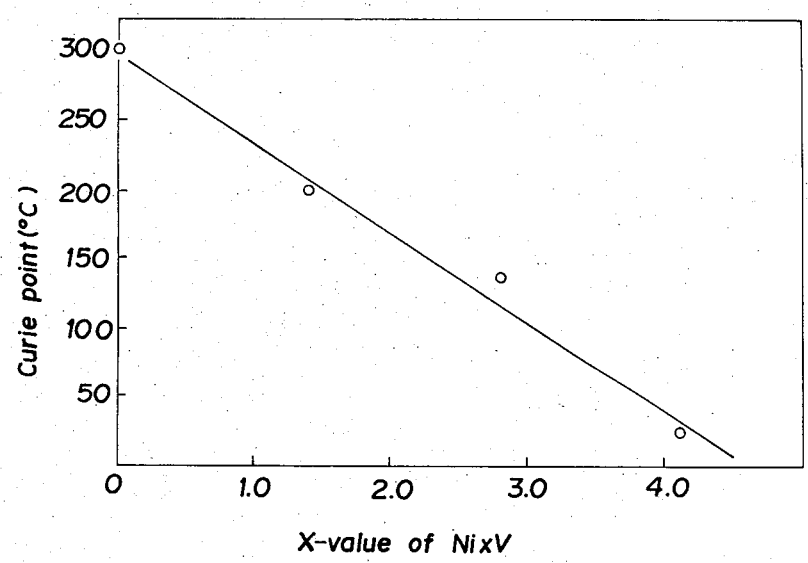
FIG. 4 is a graphical representation indicating charateristics of Curie point with respect to ratio of chemical combination of nickel-vanadium alloy.

FIG. 4 is a graphical representation wherein change in Curie point is indicated with respect to change in ratio of chemical combination (composition) of nickel-vanadium alloy $Ni_xV$. In this case, a prescribed Curie point can be also set by selecting a ratio in chemical combination of vanadium on the basis of nickel as in the case of iron nitride.

As described above, a magnetic compound is used as a magnetic material for magnetic recording medium, and the Curie point of said magnetic compound is set so as to be higher than the ambient temperature by a prescribed value on the basis of the ratio in chemical combination (composition) of components of said compound in the thermomagnetic recording apparatus according to the present invention. In accordance with the present invention, therefore, the apparatus becomes simple and inexpensive. Further there is no need for increasing heat-generating temperature of a heat-generating element.

Although the particular embodiments of the invention have been shown and described, it will occur to those with ordinary skill in the art that other modifications and embodiments exist as will fall within the true spirit and scope of the invention as set forth in the appending claims.

We claim:

1. A thermomagnetic recording apparatus comprising a heating head array driven in response to a printing signal, a magnetic recording layer previously magnetized in a prescribed direction on which a latent magnetic image is formed by heat generation of said heating head array, developing means for developing said latent magnetic image with a magnetic toner, transferring means for transferring a toner image developed to a recording medium, and fixing means for fixing the image transferred, said magnetic recording layer having a chemical composition which provides the magnetic material and has a Curie point which varies in response to the ratio of the chemical constituents in said chemical composition, said Curie point being set higher than the ambient temperature by a prescribed value dependent on the ratio of said chemical constituents, said chemical composition forming said magnetic recording layer having a hardness lower than the hardness of the heat generating element of the heating head array.

2. A thermomagnetic recording apparatus as claimed in claim 1 wherein said magnetic material is iron nitride $Fe_xN$ (x: ratio in chemical combination).

3. A thermomagnetic recording apparatus as claimed in claim 2 wherein said ratio in chemical combination is larger than 2.3 and smaller than 3.

4. A thermomagnetic recording apparatus as claimed in claim 1 wherein said magnetic material is nickel-vanadium alloy $Ni_xV$.

5. A thermomagnetic recording apparatus as claimed in claim 1 wherein said prescribed value of the ambient temperature is at least 40° C.

6. A thermomagnetic recording apparatus as claimed in claim 1 wherein said Curie point is at least 80° C.

7. A thermomagnetic recording apparatus as claimed in claim 1 wherein said magnetic material consists of two or more kinds of iron nitride FexN having a certain ratio in chemical combination.

* * * * *